United States Patent
Lubowicki et al.

(10) Patent No.: US 6,963,756 B2
(45) Date of Patent: Nov. 8, 2005

(54) ELECTRONIC EQUIPMENT COMPRISING A RETRACTABLE SCREEN

(75) Inventors: Jean-Pierre Lubowicki, Le Mans (FR); Gavin Warner, Montrouge (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 785 days.

(21) Appl. No.: 09/891,430

(22) Filed: Jun. 26, 2001

(65) Prior Publication Data

US 2002/0006813 A1 Jan. 17, 2002

(30) Foreign Application Priority Data

Jun. 30, 2000 (FR) .............................................. 00 08540
Apr. 24, 2001 (FR) .............................................. 0105504

(51) Int. Cl.[7] .............................................. H04M 1/00
(52) U.S. Cl. .............................. 455/550.1; 379/428.01; 455/575.1; 455/575.4
(58) Field of Search ....................... 379/428.01, 433.01, 379/433.04, 447; 455/128, 301, 347, 550.1, 575.1, 575.4, 566

(56) References Cited

U.S. PATENT DOCUMENTS

| | | | |
|---|---|---|---|
| 5,450,619 A | 9/1995 | Maeda | 455/89 |
| 5,719,936 A | 2/1998 | Hillenmayer | 379/447 |
| 6,128,475 A | 10/2000 | Wicks et al. | 455/90 |
| 6,208,879 B1 * | 3/2001 | Iwata et al. | 455/566 |
| 6,243,595 B1 | 6/2001 | Lee et al. | 455/566 |
| 6,262,704 B1 * | 7/2001 | Kurumisawa et al. | 345/98 |
| 6,327,482 B1 * | 12/2001 | Miyashita | 455/566 |
| 6,748,249 B1 * | 6/2004 | Eromäki et al. | 455/575.4 |

FOREIGN PATENT DOCUMENTS

| | | | |
|---|---|---|---|
| GB | 2334301 | 8/1999 | E05D/1/04 |
| WO | WO9731468 | 8/1997 | H04M/1/02 |
| WO | WO9923800 | 5/1999 | H04M/1/02 |

* cited by examiner

*Primary Examiner*—Bing Q. Bui
(74) *Attorney, Agent, or Firm*—Dicran Halajian

(57) ABSTRACT

An electronic equipment includes a housing which is formed by two housing parts of which one is integral with a retractable screen which may take up a first/closed position and a second/open position. The open position permits to see the whole screen. In the closed position, one part of the screen remains visible and the other part of the screen is hidden in a second part of the housing. This second housing part supports other elements of the equipment, such as a microphone and keyboard.

10 Claims, 6 Drawing Sheets

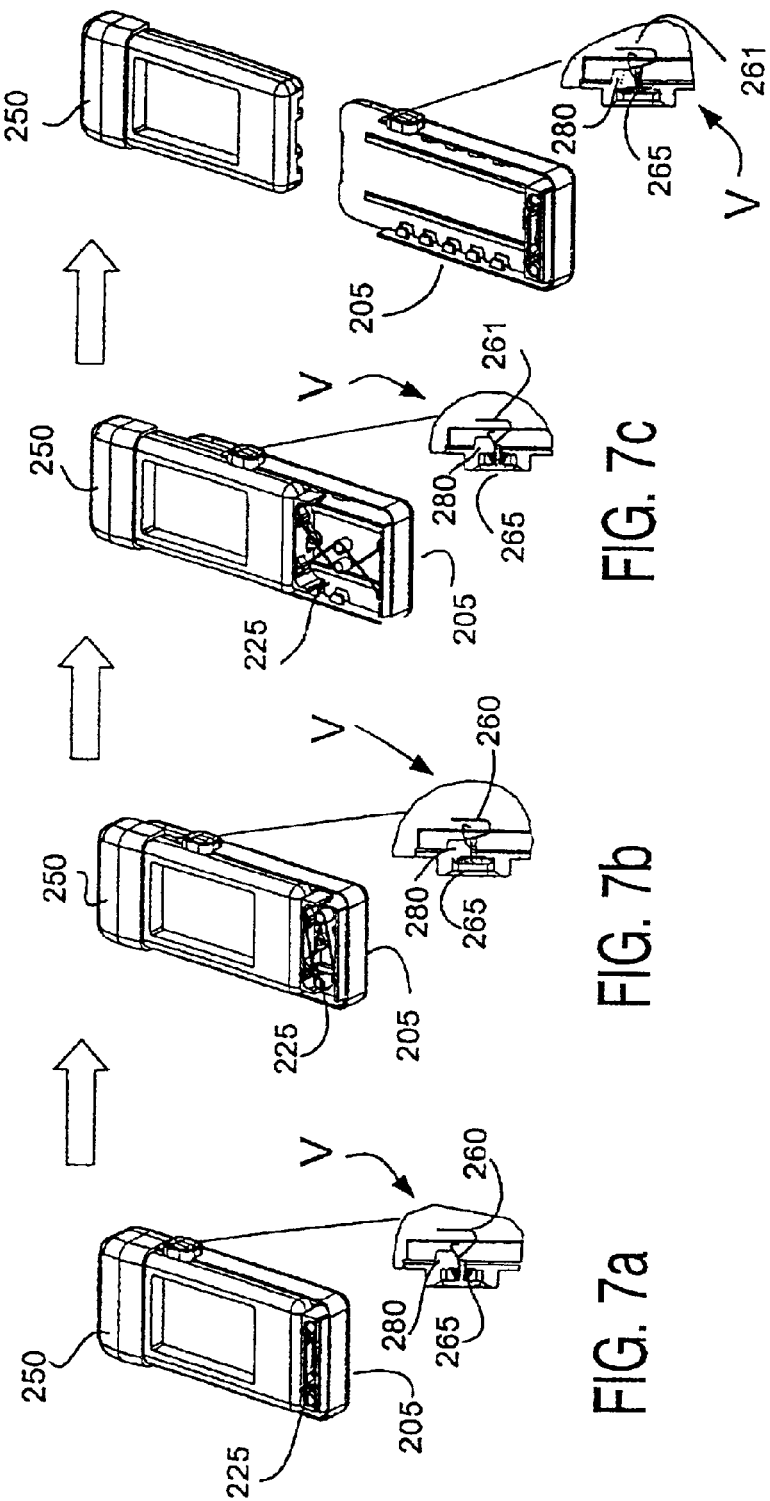

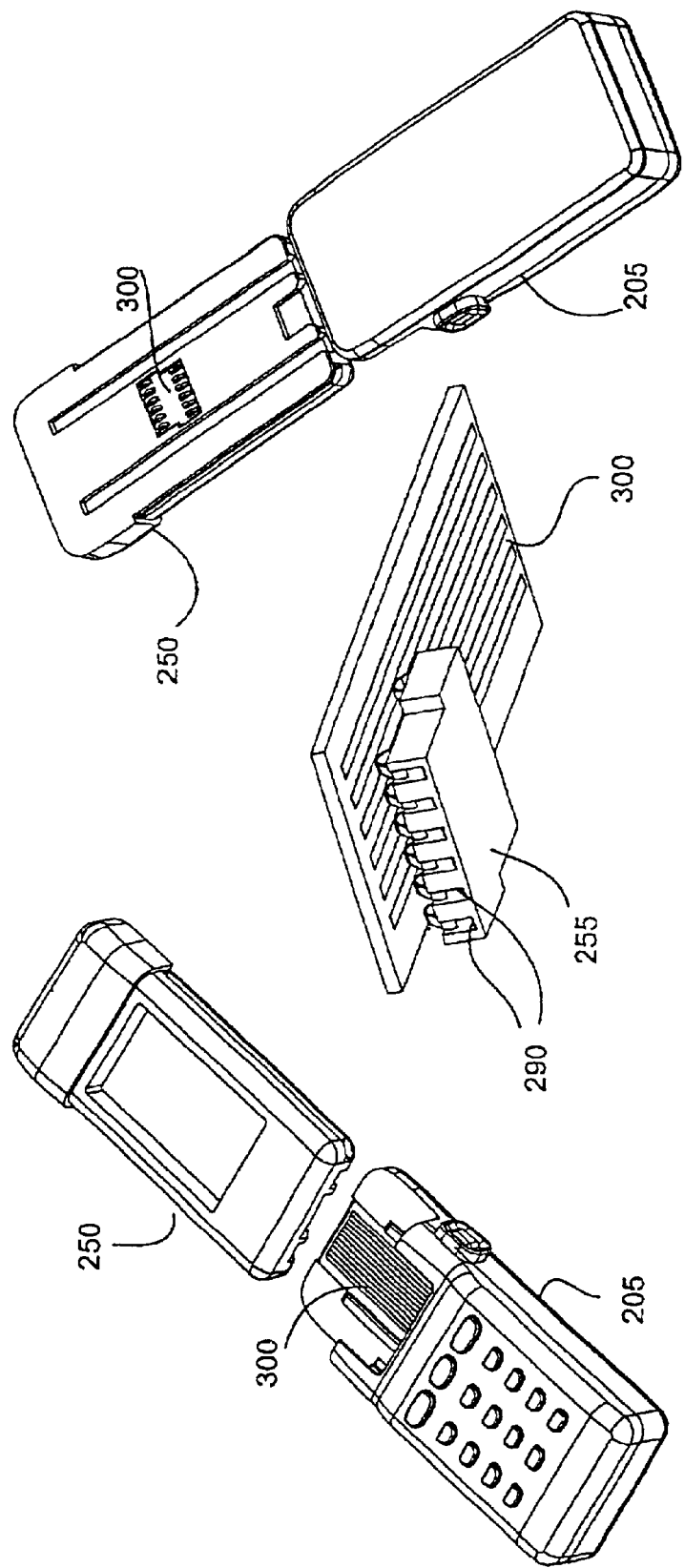

ELECTRONIC EQUIPMENT COMPRISING A RETRACTABLE SCREEN

Figure 1:
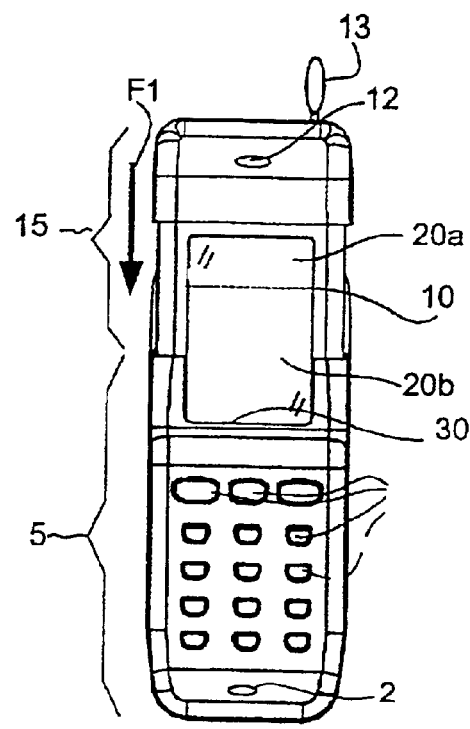

The invention relates to electronic equipment comprising a housing formed by at least two housing parts of which one called screen part is integral with a retractable screen which may take up a first position called closed position and a second position called open position relative to a part called fixed part.

The invention finds applications with particular advantage when notably the equipment is of the radiotelephony type.

Actually, this type of equipment is bound to have uses which imply the visualization of many data and, moreover, one wishes that its cumbersomeness remains limited.

A device of this type is known from patent document GB 2 334 301. In this device one of its parts on which among other things the keypad is disposed gives a complete blocking of the screen so as to protect it so that the device stops operating.

The invention proposes a device of the type defined in the opening paragraph which offers other functionalities and those of the cited prior art.

Such a device is characterized in that in the closed position the fixed part partly masks the screen.

Thus, by the measure in accordance with the invention the user, for example, in the case when the device is a mobile telephone, has the choice between two modes of operation corresponding to these two positions. When the device is in the closed position, the device behaves like a normal device and can receive calls. For controlling same, the user utilizes the visible part of the screen which may then give the name of the caller or the type of call (short messages or others). When the device is in open position, the user can see images or information such as those or that sent by the WAP system.

These and other aspects of the invention are apparent from and will be elucidated, by way of non-limitative example, with reference to the embodiment(s) described hereinafter.

Figure 2:
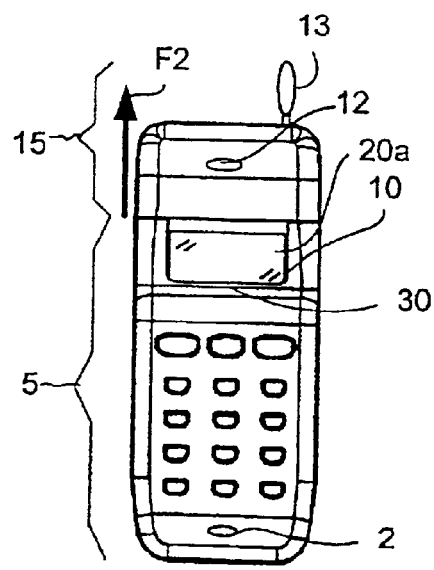
Figure 3:
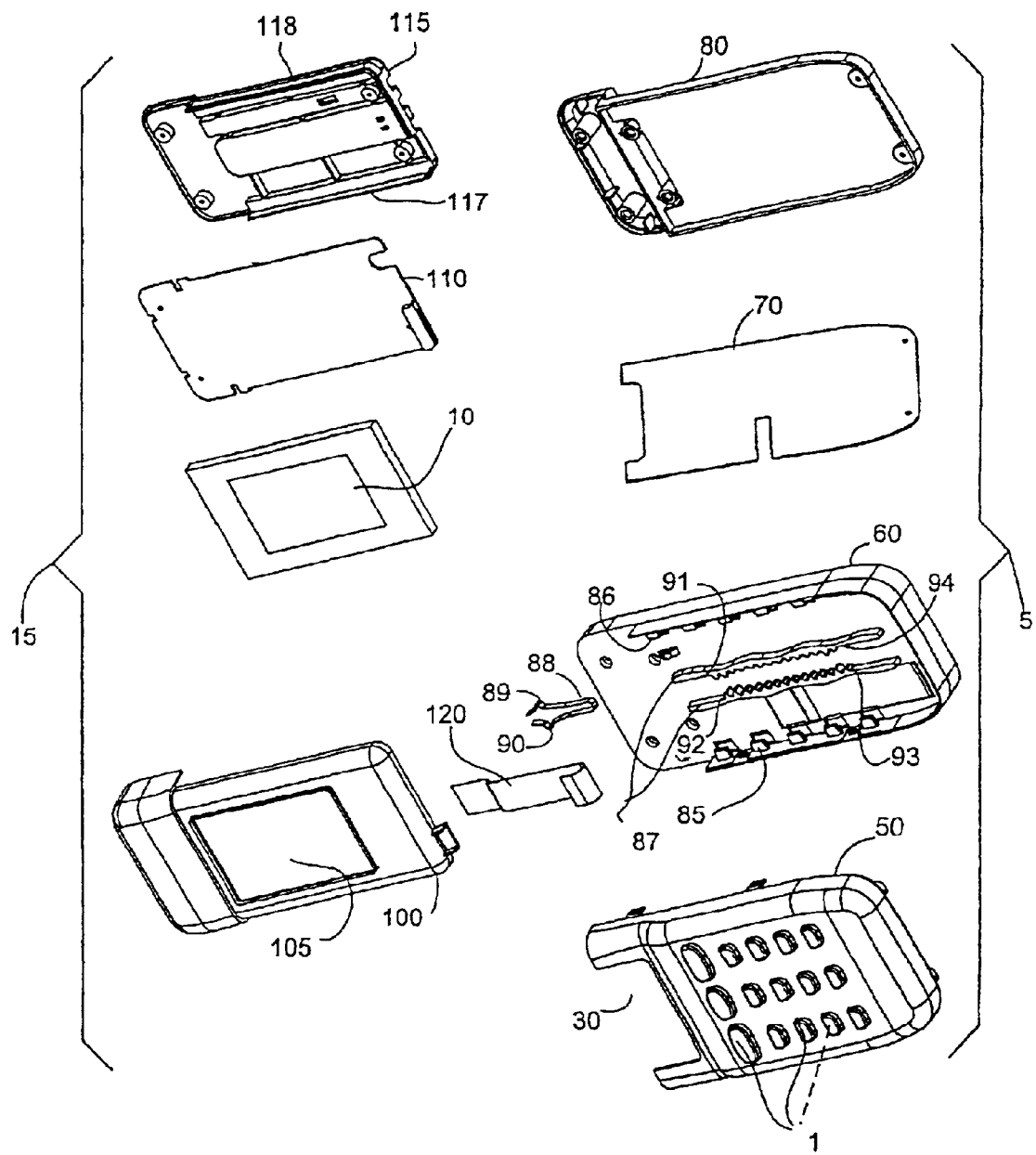
Figure 4:
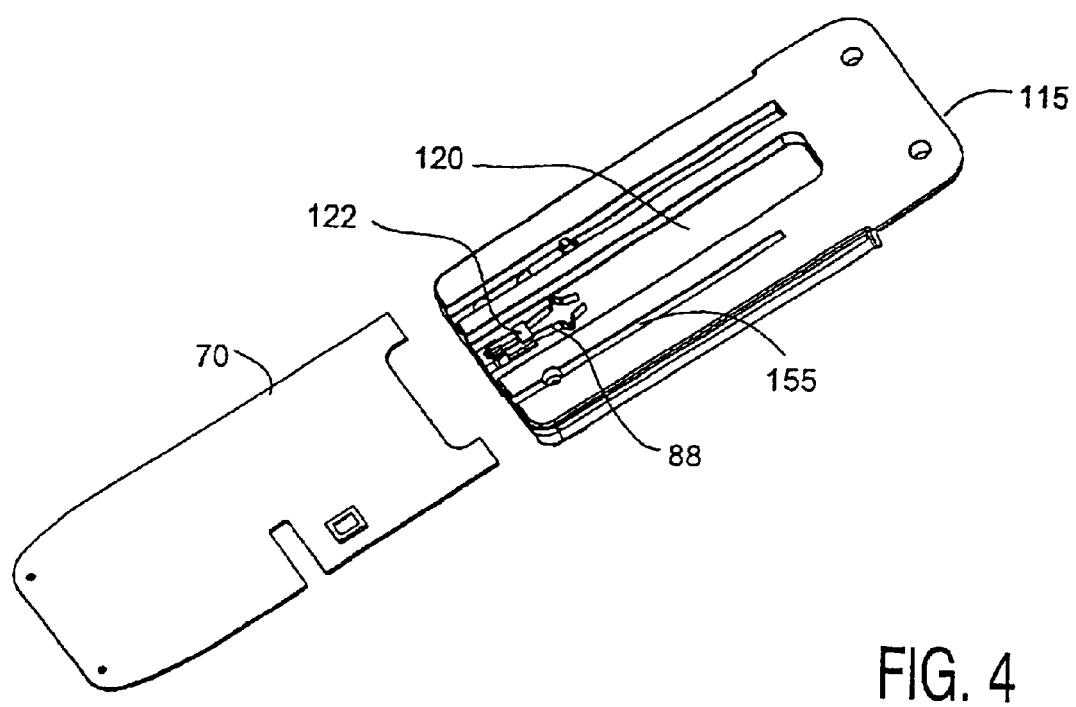
Figure 5:
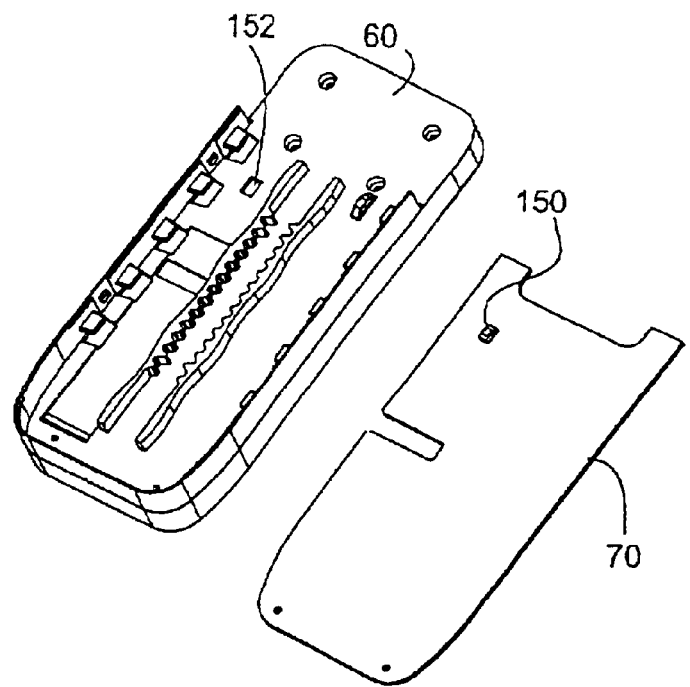
Figure 6:
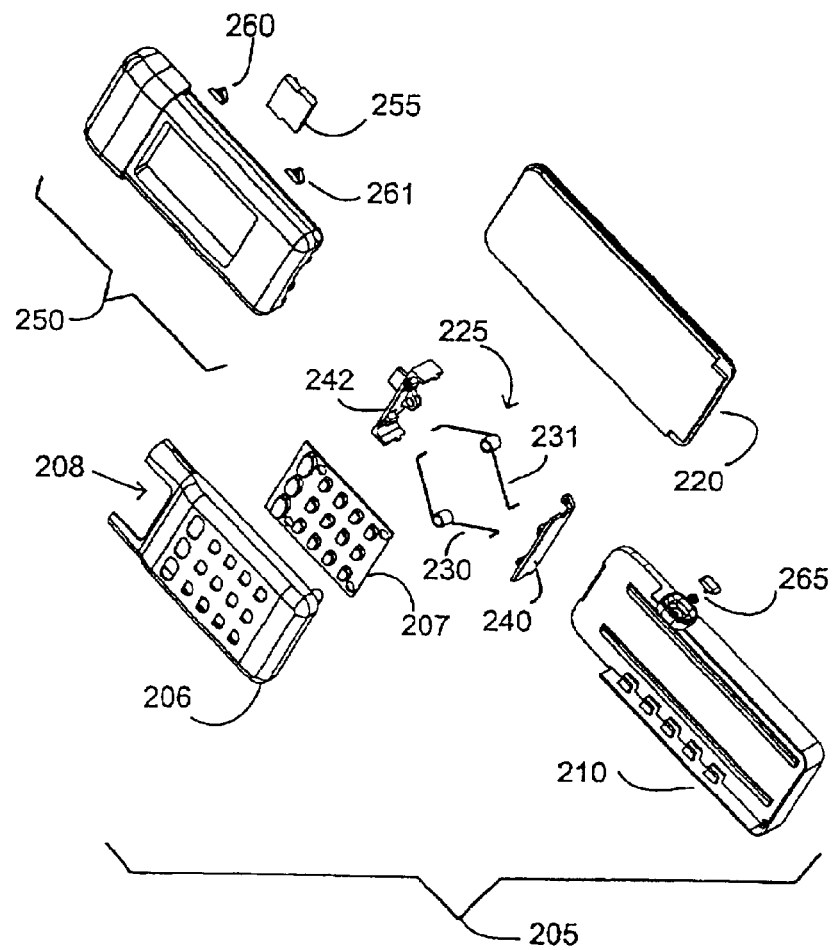
Figure 8:
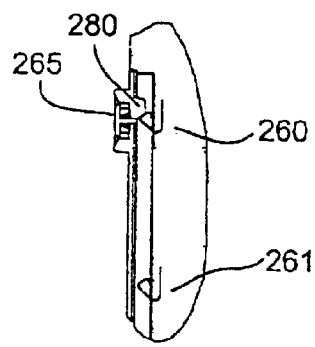

In the drawings:

FIG. 1 shows an electronic device in accordance with the invention with the screen in open position, FIG. 2 shows an electronic device in accordance with the invention with the screen in closed position, FIG. 3 shows an exploded view of the device, FIG. 4 shows still in an exploded view a detail of an embodiment of the device in accordance with the invention and FIG. 5 shows how the open and closed positions are detected, FIG. 6 shows a second embodiment of a device in accordance with the invention in exploded view, FIGS. 7a–7d show the operation of this second embodiment, FIG. 8 shows the latches utilized in this second embodiment, and FIGS. 9a–9c show how the electric connections are realized by this second embodiment.

FIG. 1 shows a device in accordance with the invention. This device comprises a keypad 1, a microphone 2 disposed on a first part of the housing 5. The device further includes a screen 10, a loudspeaker 12 and an antenna 13 mounted on another part of the housing 15. This part 15 can slide relative to part 5 until it comes to the position called closed position shown in FIG. 2, by leaving the position called open position shown in this FIG. 1.

In this FIG. 2 and the following Figures, like elements to those of FIG. 1 carry like references.

In accordance with the invention, in closed position part of the screen 20a remains visible. Thus, the screen is divided into two parts 20a and 20b. The part 20a is always visible whatever the position of the screen and the part 20b is combined with the part 20a to show a complete screen to the user to be able, for example, to visualize WAP images (similar system to Internet, but adapted to portable telephones) or others. The arrows F1 and F2 show in what direction part 15 is to be moved to come to the closed or open position respectively. A recess 30 has been made in the part 5 so as to make the screen part 20a visible in closed position.

FIG. 3 gives an exploded view of the device in accordance with the invention. The housing part 5 is broken down into a front face 50 on which the keys of the keypad 1 are placed. It is on this front face that the recess 30 is provided. This part 5 also includes a housing body 60 to the back of which a printed circuit 70 is attached and a cover 80 which may contain an accumulator for supplying power to the device. On its front are disposed slides 85 and 86 for the part 15. A rack 87 is also placed with a profile that permits to obtain hard points. In this rack can be moved a spring system 88. This system is formed by a strip having a form of a pin presenting protuberances 89 and 90 which fit in recesses 91 and 92 for the open position and 93 and 94 for the closed position by thus providing said hard points.

The housing part 15 is in the form of a front face 100 in which an opening 105 is provided that permits to see the screen 10, at the back of the screen 10 is placed a shield 110. The whole is covered at the back by a cover 115. The spring system is integral with this part 15. A flat flexible conducting cable 120 better known by the name of flex permits electrical connection between the housing part 5 and the housing part 15. On this cover 115 is provided a guiding system formed by grooves 117 and 118 which will slide over the projections 85 and 86.

FIG. 4 illustrates the way in which the spring system is made integral with the housing part 15. This FIG. 4 shows the cover 115 upside down. The system is placed in groove 120. An attachment head 122 keeps the system placed against the bottom of this groove.

FIG. 5 shows how a position detection system can be realized. This system is realized on the basis of a switch 150 soldered onto the printed circuit 70. This switch has a control pin that passes through an opening 152 provided in the part 60. This pin exceeds a certain height so that a slide 155 (FIG. 4) provided in the part 115 leaves this pin in position, but when the slide as a result of the movement from the open to the closed position ends its course, the slide is no longer present, so that the face of the part 115 will press against the pin to change the state of the switch 150. Thus the electronic part placed on the circuit 70 which controls the screen 10 will be able to provide the information that is suitable for the two screen formats.

FIG. 6 shows an exploded view of a second embodiment of a device in accordance with the invention. The first part 205 of the housing comprises a front surface 206 on which the keys of the keypad 207 are placed. It is in this front surface that the recess 208 is provided. This first part 205 also comprises a housing body 210 to the back of which is attached a cover 220 which may contain or protect an accumulator (not shown). To this first part is attached a helical spring assembly 225 formed by two springs 230 and 231 of the type that press with their first end against a first plate 240, which is integral with this first part 205 of the housing, and press with their second end against a second plate 242, which pushes against the second part 250 of the housing. An electrical connection part 255 is provided to ensure electrical connections between these two housing parts 205 and 250. To part 250 are attached two latches 260 and 261, each formed by a leaf spring. These latches cooperate with a lock button 265. Thus these latches fix two positions for displacing part 250 relative to part 205. The displacement of these two parts is ensured by projections in the same way as described for the first embodiment shown in FIGS. 1 to 5.

FIGS. 7a–7d shows the operation of this second embodiment. The various FIGS. 7a–7d show the various positions that the first part 205 of the housing can take up relative to the second part 250.

FIG. 7a shows the device in closed position. It is maintained in this position by the spring 260 which acts on a stop 280 provided in part 205. This is shown by the V linked with each of said references. This figure shows in more detail the operation of the springs 260 and 261 which cooperate with the stop 280.

FIG. 7b shows the button 265 being pressed. A press on this button releases the spring from the stop. The spring assembly 225 separates the part 250 from part 205. This release of the assembly 225 is clearly visible in this FIG. 7b.

FIG. 7c shows that this release is stopped by the second latch 261 which coincides with the stop 280.

FIG. 7d shows that, if the button 265 is pressed again, it is possible to separate the two housing parts 205 and 250.

FIG. 8 shows the positioning of the latches 260 and 261 relative to the stop 280 which cooperates with the button 265.

FIGS. 9a–9c shows how the electrical connections are ensured in this second embodiment.

In FIG. 9a, the two parts 205 and 250 are represented separated from each other so as to show an assembly of conductors 300 which forms tracks arranged on part 205.

FIGS. 9b–9c better show how the connection piece 255 performs its function. It is provided with conductors 290 formed by a bulging part intended to make contact with the assembly of conductors 300 and by a side part to ensure the contacts with the housing part 250. For this purpose, a housing 300 is provided, which has contacts for the electric connections of the side parts of the conductors 290.

What is claimed is:

1. An electronic device comprising a housing formed by at least a screen part and a fixed part, said screen part being integral with a retractable screen which may occupy a closed position and an open position relative to the fixed part, wherein in the closed position, the fixed part partly masks the screen, said screen part being separable from said fixed part.

2. An electronic device as claimed in claim 1, characterized in that said screen part is mounted on projections so as to permit it being displaced.

3. An electronic device as claimed in claim 1, characterized in that "hard points" are provided when said screen part is displaced, so that it can occupy stable positions.

4. An electronic device as claimed in claim 1, further comprising guiding parts including a first guiding part and a second guiding part, said first guiding part having recesses in which can be accommodated during the displacement a spring system which is integral with said second guiding part so as to provide stable positions for said screen part.

5. An electronic device as claimed in claim 1, characterized in that the positions of the screen between two positions are ensured by latches that can be unlocked by a button.

6. An electronic device as claimed in claim 5, characterized in that the latches permit to separate the two parts of the housing.

7. An electronic device as claimed in claim 1, wherein said closed position corresponds to a first operating mode of said electronic device and said open position corresponds to a second operating mode of said electronic device.

8. An electronic device as claimed in claim 7, wherein said first operating mode includes telephone functions and said second operating mode includes receiving information from a WAP system.

9. An electronic device as claimed in claim 1, wherein said fixed part includes a switch that protrudes from a groove in said screen part in said closed position, said switch being depressed by said screen part in said open position, wherein said electronic device is configured to switch between two screen formats in response to a position of said switch.

10. An electronic device as claimed in claim 1, further comprising position detection means, wherein said electronic device is configured to switch between two screen formats in response to signals from said position detection means.

* * * * *